United States Patent
Lim

(10) Patent No.: US 8,728,552 B2
(45) Date of Patent: May 20, 2014

(54) PROCESS FOR THE PREPARATION OF A HYDROLYSATE

(75) Inventor: Bee Gim Lim, Singapore (SG)

(73) Assignee: Nestec S.A., Vevey (CH)

( * ) Notice: Subject to any disclaimer, the term of this patent is extended or adjusted under 35 U.S.C. 154(b) by 264 days.

(21) Appl. No.: 12/747,623

(22) PCT Filed: Dec. 5, 2008

(86) PCT No.: PCT/EP2008/066914
§ 371 (c)(1),
(2), (4) Date: Jun. 11, 2010

(87) PCT Pub. No.: WO2009/077359
PCT Pub. Date: Jun. 25, 2009

(65) Prior Publication Data
US 2010/0260890 A1    Oct. 14, 2010

(30) Foreign Application Priority Data
Dec. 14, 2007   (WO) ................. PCT/EP2007/063980

(51) Int. Cl.
*A23L 1/28* (2006.01)

(52) U.S. Cl.
USPC ............... 426/18; 426/60; 426/52; 426/46; 426/61

(58) Field of Classification Search
USPC .................................. 426/18, 60, 52, 46, 61
See application file for complete search history.

(56) References Cited

U.S. PATENT DOCUMENTS

| | | | |
|---|---|---|---|
| 3,932,671 A * | 1/1976 | Yokotsuka et al. | 435/68.1 |
| 5,141,756 A | 8/1992 | Bajracharya et al. | |
| 5,561,067 A | 10/1996 | Shabalin et al. | |
| 5,965,178 A * | 10/1999 | Baensch et al. | 426/52 |
| 2004/0038391 A1* | 2/2004 | Pyntikov et al. | 435/289.1 |
| 2004/0166200 A1 | 8/2004 | Ninomiya et al. | |

FOREIGN PATENT DOCUMENTS

| | | |
|---|---|---|
| CN | 1050426 A | 4/1991 |
| CN | 1050426 C | 2/1994 |
| CN | 1541562 | 11/2004 |
| EP | 0 913 097 | 5/1999 |
| EP | 1363504 | 11/2003 |
| EP | 1 428 440 | 6/2004 |
| JP | 04-197153 | 7/1992 |
| JP | 04-365460 | 12/1992 |
| JP | 2003-319756 | 11/2003 |
| JP | 58-111660 | 1/2011 |
| RU | 2295868 | 3/2007 |
| WO | 2004 045310 | 6/2004 |

OTHER PUBLICATIONS

Deng, C. et al. CN-101601459 (Dec. 16, 2009)—English Abstract.*
International Search Report for Appl. No. PCT/EP2008/066914 dated Jan. 15, 2009, 3 pages.
European Office Action for EP 08 862 916.7, dated Nov. 30, 2010.

* cited by examiner

*Primary Examiner* — D. Lawrence Tarazano
*Assistant Examiner* — Hamid R Badr
(74) *Attorney, Agent, or Firm* — K&L Gates LLP

(57) ABSTRACT

A process of preparing a hydrolysate of an edible solid substrate is provided. The edible solid substrate may be of animal or plant origin including edible animal meat, fish meat, shellfish meat or an edible plant or a combination thereof. The process includes preparing a fermented koji from a protein containing material and a carbohydrate, mixing the fermented koji with a selected edible solid substrate to form a mixture and hydrolysing the mixture in an environment with less than 2% salt content, preferably in a substantially salt-free condition. In another embodiment, the fermented koji may be prepared from an edible solid substrate itself. The hydrolysate may be further subjected to a moromi fermentation stage to obtain a food composition. Alternatively, a culture of a lactic acid bacteria may be inoculated to the mixture prior to the hydrolysis, which therefore eliminates the moromi fermentation and accelerated the process.

35 Claims, No Drawings

PROCESS FOR THE PREPARATION OF A HYDROLYSATE

FIELD OF INVENTION

The present invention relates to a process for the preparation of a hydrolysate, more particularly it relates to a process for the preparation of a hydrolysate from an edible solid substrate that is of animal or plant origin, and the hydrolysate can be used as a cooking base or savoury flavourings.

BACKGROUND OF THE INVENTION

Fish sauces or fish fermented products are widely consumed as seasonings or cooking aid in Asian countries such as Japan, China and Southeastern countries such as Vietnam, Cambodia, Thailand and others. They are also widely consumed in Europe and North America. Fish sauces or fish fermented products are traditionally prepared through the fermentation of fish in the presence of salt.

The traditional method of preparation is usually based on a process involving autohydrolysis by endogeneous enzymes from fish. Such process requires a fermentation period of about 6 to 12 months to obtain an acceptable yield and sensory properties. In view of the relatively long production time, there have been many strategies, solutions or alternatives being proposed to reduce the production time.

One of the proposed methods is by adding hydrochloric acid to hydrolyse protein by which the time required is reduced to only a few hours. However, such process resulted in inferior flavour. Products that were produced by such method have very little aroma and taste and in most cases, some chloro-compounds may arise from the acid process.

Another proposed method for fish sauce production is by adding enzyme-rich components to accelerate the protein hydrolysis. Plant enzymes such as bromelain from pineapple stems or papain from unripe papaya have been used as addition. Although fish sauce can be recovered after 3 to 4 weeks, the characteristic and particularly the flavour of the finished product is inferior to the traditional fish sauce. A major problem that has arisen is that such product is generally accompanied by intense bitterness.

On the other hand, high amount of salt is added in the traditional method used to produce fish sauces or fish fermented products. The high salt concentration strongly inhibits the activities of most of the proteolytic enzymes. As such, the fish sauce produced under high salt concentration is far from optimal. Furthermore, as a substantial long period of time is required for preservation in salt solution and degradation, the salt contents in the final product is considerably high. Hence, many processes, solutions and alternatives have been proposed with the objectives of resolving the above problems.

Japanese patent application no. 2003-319944 tries to reduce the use of salt by producing a seasoning material under a highly sterilised condition. This application discloses a seasoning material obtained by mixing sterilised residue from dried fish extraction with a solid koji produced under sterilised condition, and degrading the mixture in the sterilised salt-free state. In this invention, residue from dried fish extraction is used as one of the main materials in the production of the seasoning material. The residue from dried fish extraction is a by-product from the dried fish processing factory. While the nutrients of the residue from dried fish extraction are lost during extraction, it also provides a poor flavouring power. In addition, although the process as disclosed in the application is a salt-free process, the process needs to be performed in a completely sterilised condition from the beginning step of preparing the residue from dried fish extraction, preparing koji, to the step of degrading the mixture of sterilised residue from dried fish extraction and koji. Sterilisation may increase the cost and level of difficulties involved in the production. Further, sterilisation may also overheat the food product which will therefore impair the organoleptic properties of the food products produced thereby.

In addition, the fish sauce produced through the traditional method possess a fishy flavour and unpleasant odour. The fishy flavour and unpleasant odour are sometime limiting the acceptability of consumers and such fish sauce may also be impairing the taste of food rather than enhancing it. In order to overcome these problems, various methods to reduce the fishy flavour and unpleasant odour have been proposed. International patent publication no. WO2004045310 discloses a process for the preparation of fish sauce by removing the gastro-intestine tract, and the fish flesh is mixed with ginger and tamarind before fermentation in order to reduce the fishy smell. However, this proposed method is not capable of effectively removing the undesirable odour of products but at that same time, it increases the production costs where other materials need to be prepared and added to the fish fermentation and further steps also need to be taken. Moreover, if the discarded internal organs are not disposed off in a proper way, it may become a potential environmental hazard. This is more acute when the amount of the discarded internal organs is normally quite considerable as huge amount of fish are needed since it is the main material in the production.

The conventional methods for preparing fish sauce are generally intended to produce liquid seasonings and therefore the methods are designed in such a way that the fermented product needs to undergo a pressing process to separate the liquid portion from the solid portion and only liquid portion of the fermented products are usable as seasonings. Usually, the solid portion is deemed unsuitable or unacceptable to be used or reproduced as a food composition.

SUMMARY OF THE INVENTION

In view of the problems faced by conventional methods of producing fermented fish sauce or fermented fish products which are the requirement of a substantial long period of time, the high salt contents and the existence of fishy smell or unpleasant odour, the emergence of an improved process or method that is capable of solving these problems will be an advancement in this field.

It is therefore an object of the present invention to provide a process for the production of a hydrolysate of an edible solid substrate which may be later used in the preparation of various food compositions.

Another object of the present invention is to provide an accelerated process which is capable of producing the food composition within a shorter time. Further, as no salt is added during the hydrolysis process, the hydrolysis is performed at a substantially, or more preferably completely salt free state. As such, the food composition produced using the hydrolysate of the present invention is low in salt content.

Still, another object of the present invention is to provide a process of preparing a hydrolysate by hydrolysing an edible solid substrate using koji enzyme.

According to the present invention, the edible solid substrate is of animal origin including animal meat, fish meat or shellfish meat. The fish meat and shellfish meat that can be used in the present invention include various fishes, shrimp, baby shrimps, squid, cuttlefish, anchovies, clams, mussels, crabs, dried scallops, dried oysters etc. Apart from dried or dehydrated animal meat, fish meat or shellfish meat, the process of the present invention also enable fresh fish to be used as a raw materials without the removal of their viscera or without the need to take any major pre-processing steps apart from washing and, optionally, mincing.

The process of the present invention may also be used to prepare hydrolysate of an edible solid substrate of plant origin. The edible solid substrate of plant origin is any vegetables, legumes, leaves, flowers, stems, seeds, fruits or any other edible materials obtainable from plant such as mushrooms, green peas, pulses, onions, garlic, cabbage or any other edible plant.

If desired, a combination of animal and plant materials can be used to produce the hydrolysate according to the present invention.

A further object of the present invention is to provide fermented food compositions by adding a culture of a lactic acid bacteria during preparation of koji or during hydrolysis stage.

Another object of the present invention provides a hydrolysate which is excellent in flavour, taste as well as texture. Therefore the hydrolysate produced through the process of the present invention can be used to prepare liquid seasonings by obtaining the liquid sauce from the hydrolysate or alternatively, it can be used directly, without pressing, to produce other food compositions in paste or solid form.

One aspect of the present invention relates to a process of preparing a hydrolysate of an edible solid substrate which comprises preparing a fermented koji from a protein containing material and a carbohydrate. The fermented koji is then mixed with an edible solid substrate to form a mixture whereby the mixture is hydrolysed in an environment with less than 2% salt content by weight, based on the weight of the mixture of edible solid substrate and fermented koji.

In this context, the fermented koji is prepared by inoculating a protein containing material and a carbohydrate with a culture of *Aspergillus* comprising any one of *Aspergillus oryzae* and *Aspergillus sojae* or a combination thereof, on a culture bed to form the fermented koji. The protein containing material is preferably any one or a combination of wheat gluten, rice gluten, corn gluten or soya beans.

The aforementioned process of preparing a hydrolysate may also use a fermented koji which is prepared from the edible solid substrate itself with or without carbohydrate. In the context that the fermented koji is prepared from an edible solid substrate itself, the prepared fermented koji will be subjected to the hydrolysis process in an environment with less than 2% salt content by weight, based on the weight of the fermented koji to form the hydrolysate.

The fermented koji of an edible solid substrate itself is prepared by inoculating a selected edible solid substrate with a culture of *Aspergillus* on a culture bed to form the fermented koji.

In the preferred embodiment of the present invention, the hydrolysis is carried out in an environment with less than 2% salt content or preferably complete absence of salt to provide an optimum condition for enzymes activities.

Second aspect of the present invention concerns, in addition to the culture of *Aspergillus*, the inoculation of the koji with a culture of a lactic acid bacteria. The inoculation of a lactic acid bacteria may take place during the preparation of koji or during the hydrolysis stage. If the inoculation of a lactic acid bacteria is to take place during the preparation of koji, the culture of lactic acid bacteria may be inoculated before or after the culture of *Aspergillus*. If the inoculation of lactic acid bacteria is to take place during the hydrolysis, it can take place at either the beginning or middle of hydrolysis but preferably at the beginning.

The third aspect of the present invention relates to a process of preparing a food composition by further fermenting the hydrolysate prepared according to the present invention, i.e. hydrolysate prepared by hydrolysing the mixture of an edible solid substrate and a fermented koji prepared from a protein containing material with a carbohydrate. The detailed process comprising the steps of:
a) preparing a fermented koji from a protein containing material and a carbohydrate;
b) preparing an edible solid substrate comprising any one or a combination of plant or animal origin;
c) adding water to the fermented koji of step (a) with the edible solid substrate to form a mixture;
d) hydrolysing the mixture to form a hydrolysate;
e) adding brine solution and yeast into the hydrolysate produced at step (d) to form a moromi; and
f) fermenting the moromi to form the food composition.

The third aspect of the present invention may also use the hydrolysate prepared from the fermented koji which is prepared from the edible solid substrate itself as described in first aspect above. The detailed process comprising the steps of:
a) preparing a fermented koji from an edible solid substrate with or without a carbohydrate;
b) hydrolysing the fermented koji of step (a) to form a hydrolysate;
c) adding brine solution and yeast into the hydrolysate produced at step (b) to form a moromi; and
d) fermenting the moromi to form the food composition.

A fourth aspect of the present invention relates to a process of preparing a food composition which is similar to the third aspect of the present invention, however a culture of a lactic acid bacteria is added prior to the hydrolysis stage to form a food composition. Another difference is that the process is carried out without the moromi fermentation stage. The detailed steps involved in the process of this aspect are as follows:
a) preparing a fermented koji from a protein containing material and a carbohydrate;
b) preparing an edible solid substrate comprising any one or a combination of plant or animal origin;
c) adding water to the fermented koji of step (a) and mixing with the edible solid substrate to form a mixture;
d) hydrolysing the mixture of step (c) at a pre-determined temperature to form a hydrolysate; and
e) processing the hydrolysate produced at step (d) into the food composition.

The above process may be carried our by using hydrolysate that is obtainable through the hydrolysis of fermented koji prepared from an edible solid substrate itself. The steps involved are as follows:
a) preparing a fermented koji from an edible solid substrate and a carbohydrate;
b) adding water to the fermented koji of step (a) to form a slurry;
c) hydrolysing the fermented koji of step (b) at a predetermined temperature to form a hydrolysate; and
d) processing the hydrolysate produced at step (c) into the food composition.

The process of the fourth aspect may further comprise a step of inoculation with a culture of a lactic acid bacteria during the koji fermentation stage or during hydrolysis stage preferably at the beginning of the hydrolysis stage.

The hydrolysis of the present invention is carried out at a temperature between 45° C. to 60° C. or between 2° C. to 15° C. or between 15° C. to 45° C. if a culture of a lactic acid bacteria is previously inoculated. The hydrolysis is to continue for a period between 5 hours to 14 days to form a hydrolysate.

The hydrolysate obtainable from the process of the present invention may be used as a base, in liquid, paste or solid form for various culinary products. The hydrolysate produced through the fourth aspect of the present invention may be further processed, without pressing, into various food compositions in the form of a cooking paste, cubes, powder or granules.

DETAILED DESCRIPTION OF THE PREFERRED EMBODIMENTS

The present invention relates to a process of preparing a hydrolysate of an edible solid substrate. The hydrolysate of the present invention may be further processed or formulated into various food compositions. Particularly, the hydrolysate prepared according to the process of the present invention possesses an excellent texture and therefore it is not only can be used to produce liquid seasonings by subjecting the hydrolysate to a pressing process to extract the liquid sauce but it also can be used directly, without pressing, to produce pasty products, which is something that most of the conventional methods are unable to achieve. In the conventional method, the hydrolysate is normally pressed to separate liquid a sauce from a solid residue and only the liquid sauce will be further processed into seasonings whereas the solid residue, more often than not, will be discarded as waste.

The term "food composition" as used in the present invention refers to any edible material which may be in liquid, paste, solid or powder form. The food composition of the present invention can be used as an ingredient or cooking base for various culinary applications in the preparation of soups, sauces, gravies, dishes, or it can be added into various culinary products as a taste enhancer, garnish, seasoning or dip for imparting the deliciousness of food.

According to the present invention, the hydrolysates and food compositions produced therefrom are rich in taste and aroma. They are excellent in taste and flavour with a reduced or complete absence of fishy smell.

On the other hand, the process of the present invention requires a shorter time of production as compared to the other conventional fermentation methods. Although the length of production time is shortened, the process of the present invention actually provides a higher degree of hydrolysis and yield. This is achieved by hydrolysing an edible solid substrate using enzymes obtainable from a fermented koji and by controlling the parameters during hydrolysis. Another advantage of the process of the present invention is that there is no salt added during hydrolysis. Enzymes are salt sensitive and high salt concentration will inhibit enzyme activities. An environment that is substantially free of salt or with complete absence of salt provides an optimum condition for enzyme activities. Therefore, the hydrolysis of the present invention allows a better protein hydrolysis where enzymes activities are maximised.

As no salt is added to the material in the hydrolysis for preservation purposes, the preservation is thus achieved by controlling the temperature of the hydrolysis at a temperature which is unfavourable for the growth of pathogenic or undesirable microorganisms. Preferably, a culture of a lactic acid bacteria may be added to enhance the hydrolysis and to further prevent deterioration of the mixture throughout the hydrolysis. The addition of lactic acid bacteria may also eliminates the need of a fermentation process which normally requires a longer period of time.

The process of preparing hydrolysates and food compositions according to the present invention can be carried out in a few alternative routes which will be described in detail below.

One of the important features of the present invention is that the hydrolysate is of an edible solid substrate.

The term "edible solid substrate" as used herein refers to a substrate which is of animal or plant origin. The edible solid substrate includes any edible animal meat, fish meat or shellfish meat or any edible plant. The fish meat and shellfish meat that can be used in the present invention include various fishes, shrimp, baby shrimps, squid, cuttlefish, anchovies, clams, mussels, crabs, dried scallops, dried oysters etc. Substrate of plant origin that can be used in the present invention is any vegetables, legumes, leaves, flowers, stems, seeds, fruits or any other edible materials obtainable from plant such as mushrooms, green peas, pulses, onions, garlic, cabbage or any other edible plant.

The process of the present invention enables fresh fish or shellfish to be used as raw materials without the removal of their viscera or without the need to take any major pre-processing steps apart from washing and, optionally, chopping.

Another important feature of the present invention is that the koji enzyme is used to hydrolyse the edible solid substrate. There are basically two ways to prepare the fermented koji for hydrolysis in the present invention. The koji can be prepared from a protein containing material comprising any one or a combination of wheat gluten, rice gluten, corn gluten or soya beans by inoculating the selected protein containing material and a carbohydrate with a culture of *Aspergillus* on a culture bed to form the fermented koji. Alternatively, the fermented koji can be prepared from an edible solid substrate itself by inoculating the selected edible solid substrate with a culture of *Aspergillus* on a culture bed to form the fermented koji. These two types of fermented koji are applicable to any one of the following possible routes in the production of hydrolysates and/or food compositions.

Upon preparing the fermented koji, the hydrolysis can be commenced according to the process of the present invention. One aspect of the present invention concerns a process of preparing a hydrolysate of an edible solid substrate as described above by mixing the fermented koji prepared from a protein containing material and a carbohydrate with an edible solid substrate and hydrolysing the resulting mixture under a pre-determined condition to form the hydrolysate. If the fermented koji used is prepared from the edible solid substrate itself, the fermented koji can be subjected to a hydrolysis process without the mixing step.

Preferably, the hydrolysis is performed in an environment with less than 2% salt content by weight based on either the weight of the mixture of edible solid substrate and fermented koji prepared from a protein containing material, or the weight of the fermented koji prepared from an edible solid substrate. More preferably, the hydrolysis of the present invention is performed in the absence of salt.

Hydrolysis of the mixture of an edible solid substrate and a fermented koji prepared from a protein containing material creates a complex flavour to the hydrolysate at the end of hydrolysis. For example, if fish is hydrolysed in the presence of a fermented koji prepared from soya beans, the hydrolysate produced therefrom will have a complex flavour of fish and soya beans. Similarly, if vegetable is added for hydrolysis, the hydrolysate produced therefrom will have an even more complex flavour of fish, soya beans and vegetable.

As afore-mentioned, the hydrolysis of the present invention is carried out in an environment which is substantially salt-free or in the complete absence of salt. Therefore the growth of undesirable microorganisms is restricted or inhibited by controlling the temperature of the hydrolysis. Preferably, the hydrolysis of the present invention is conducted at a temperature between 45° C. to 60° C. or between 2° C. to 15° C. for a period between 5 hours to 14 days. These two ranges of temperature are chosen as these are the temperatures that discourage the growth of most of the undesirable microorganisms throughout the period of hydrolysis. Microorganisms possess specific growth requirements and one of which is temperature. Every microorganism has an optimum growth temperature, i.e. the temperature at which the microorganism's growth is at its peak. Every microorganism also has a minimum growth temperature at which its growth will be ceased if the temperature drops below that, and a maximum growth temperature at which it will die if the temperature rises above that. The temperature range can differ greatly from one microbe to another. Generally, most of the microorganisms, especially most of the microorganisms that can cause food spoilage, are active at temperatures between 20° C. to 40° C.

In a second aspect of the present invention, in addition to the culture of *Aspergillus* in preparing the fermented koji, a culture of lactic acid bacteria can be added either at the fermentation of koji or during hydrolysis stage. The lactic acid bacteria which can be added comprising any one or a combination of bacteria from the genus of *Lactobacillus, Leuconostoc, Pediococcus* and *Streptococcus*.

The addition of a culture of lactic acid bacteria may also act synergistically with the controlled temperature to inhibit the growth of undesirable microorganisms in the subsequent hydrolysis. Lactic acid bacteria have the property of producing lactic acid from glucose. Similar to temperature, each microorganism has a pH range within which its growth is possible. Each microorganism usually has a well-defined optimum pH level at which its growth rate is at the maximum. Most of the bacteria grow well at a neutral or slightly alkaline pH and the growth rate becomes slower when the pH values becomes lower or higher. The property of lactic acid bacteria of producing lactic acid from glucose enables the environment for hydrolysis to be maintained at a substantially acidic condition, which discourages the growth of microorganisms. Lactic acid bacteria is also believed to be able to inhibit the growth of pathogenic or undesirable microorganisms through the production of bacteriocins. Bateriocins are proteins or protein complexes produced by bacteria to inhibit the growth of similar or closely related bacterial strains. In addition, lactic acid bacteria also inhibit the growth of microorganisms through the production of other metabolic products such as hydrogen peroxide, carbon dioxide and diacetyl.

The addition of a culture of lactic acid bacteria results in a higher level or degree of release of amino acids than what is generally possible with conventional methods. The food compositions of the present invention have a higher amino acid content as compared to the products presently available in the market. Because of the higher amino acid content, the food compositions of the present invention have a fuller body and excellent organoleptical stability. With the presence of lactic acid bacteria, amino acids will be transformed into aroma compounds that contribute greatly to the flavour and taste.

Hydrolysate produced from a process as described above may also be further subjected to a moromi fermentation stage to form a food composition. Therefore, a third aspect of the present invention relates to a process of subjecting the hydrolysate of the present invention to a moromi fermentation stage. To achieve this, yeast and brine solution may be added to the hydrolysate to form a moromi and allow the moromi to be fermented.

The fermented mixture can be pressed for the purpose of separating a liquid sauce from a solid residue. The liquid sauce extracted thereby will then be pasteurised at a temperature between 90° C. to 140° C. for a period between 15 seconds to 30 minutes after which it will be filtered to give a liquid seasoning. Alternatively, the liquid sauce can be made into powdery form by concentrating the liquid sauce, then dried to a low moisture content and finally milled into powdery form thereby producing a seasoning in powdery form.

Fourth aspect of the present invention concerns a process of producing a hydrolysate or a fermented fish product by adding a culture of a lactic acid bacteria for hydrolysis, without going through a moromi fermentation. The food composition is prepared by the process similar to that of the process of preparing a hydrolysate as described above. However, a culture of a lactic acid bacteria is added during the preparation of koji or during the hydrolysis stage. The culture of a lactic acid bacteria is inoculated at an inoculation density from $10^4$ to $10^9$ colony forming units per gram (cfu/g) of fermented koji prepared from a protein containing material or from an edible solid substrate, or the hydrolysis mixture of edible solid substrate and fermented koji prepared from a protein containing material.

In this case where a culture of a lactic acid bacteria is present during the hydrolysis stage, the temperature for hydrolysis should be adjusted to be maintained between 15° C. to 45° C.

In another embodiment of the present invention, the slurry may be subjected to a process of wet milling during hydrolysis stage so that the texture of the hydrolysate produced therefrom will be finer in form and is more suitable to be produced into a pasty product. The wet milling is preferably to be done one to four hours after the start of hydrolysis.

Finally, the hydrolysate may be pasteurised at a temperature between 90° C. to 140° C. for a period between 15 seconds to 30 minutes. The pasteurised hydrolysate may be further processed, with or without pressing, into various food compositions in liquid, paste or other solid forms such as seasonings, cooking pastes, cubes, powder or granules. Optionally, salt may be added to the hydrolysate before the pasteurisation process to enhance the taste.

It is not necessary for the process of the present invention to be carried out in a completely sterilised environment and it may even be carried out in a non-sterilised environment without the growth of undesirable microorganisms that may spoil the mixture for hydrolysis.

The present invention also relates to food products prepared using any of the above-described routes.

The present invention will now be further illustrated by the following Examples. The examples are intended for illustration only and the present invention is not in any way limited by the examples.

Example 1

55 kg of defatted soya bean mill was soaked in 70 kg water at 75° C. for 40 minutes. The soaked soya bean mill was then heated to 124° C. and held at the same temperature for 10 minutes and afterwards cooled to below 40° C. by applying a vacuum. Finally the cooked soya bean mill was mixed with a mixture of 50 kg of roasted wheat and 25 g of TKJ (*Aspergillus oryzae* seed inoculum) to give a soya koji which was then fermented for 42 hours. The soya koji contained no added salt.

During the 42 hours of koji fermentation, the following temperature profiles were maintained for the culture bed:
0-25 hours 30° C.
25-42 hours 27° C.

The koji was mixed at the 18th and 25th hours to ensure sufficient airflow through the culture bed for good ventilation.

60 kg of the fermented koji was added into a 250 L jacketed stirred tank containing water at 55° C. The water to koji ratio was set at 1.8.

Fresh fish was first rinsed with water to eliminate foreign matter. The fish was then loaded into the mincer with a screen size of 3 mm. After 15 minutes of koji hydrolysis, minced fish was added to the koji suspension at a fish to koji ratio of 1:1.

After 1 hour of hydrolysis, the mixture was milled by a colloidal mill. After the milling, the hydrolysis was continued for another 20 hours to achieve a higher degree of hydrolysis. After the hydrolysis, salt was added at 12% m/m to the hydrolysate and mixed homogenously. This was to retard the growth of micro-organisms. The hydrolysate was pasteurised at 95° C. for 15 minutes before being packed into a plastic container for storage.

The hydrolysate was found to have excellent body and a rounded flavour profile. The hydrolysate was formulated with other fresh ingredients to form a food composition.

Example 2

50 kg of fresh fish was first rinsed with water to eliminate foreign matter. The fish was then loaded into the mincer with a screen size of 3 mm. Minced fish was mixed with 50 kg of roasted wheat flour with a blender. The dough was then extruded with the meat mincer to form cylindrical rod-like substrate with a diameter of 5 mm.

The substrate was autoclaved at 100° C. for 20 minutes. Finally the cooked fish substrate was mixed with 20 g of TKJ (*Aspergillus oryzae* seed inoculum) to give a fish koji which was then fermented for 42 hours by a procedure similar to that used in a conventional soya sauce production process. The koji contained no added salt.

During the 42 hours of koji fermentation, the following temperature profiles were maintained for the culture bed:
0-25 hours 30° C.
25-42 hours 27° C.

The koji was mixed at 18th and 25th hours to ensure sufficient airflow through the culture bed for good ventilation.

50 kg of the fermented koji was added into a 250 L jacketed stirred tank containing water at 45° C. The water to koji ratio was set at 1.8.

After 1 hour of hydrolysis, the mixture was milled by a colloidal mill. After the milling, the hydrolysis was continued for another 20 hours to achieve a higher degree of hydrolysis. After the hydrolysis, salt was added at 12% m/m to the hydrolysate and mixed homogenously. This was to retard the growth of micro-organisms. The hydrolysate was pasteurised at 95° C. for 15 minutes before being packed into a plastic container for storage.

The hydrolysate was found to have excellent body and a rounded flavour profile. The hydrolysate was formulated with other fresh ingredients to form a food composition.

Example 3

A similar procedure to that as described in Example 1 was followed except that after the hydrolysis at 55° C. for 20 hours, the hydrolysate was subjected to a 2 week moromi fermentation process, after the addition of salt (12% m/m) and a yeast inoculum.

Finally, the hydrolysed mixture was pressed to separate a soya fish sauce from a solid residue. The sauce was treated at 90° C. for 20 minutes. The liquid sauce was concentrated by evaporation. The concentrate obtained was dried in a vacuum oven and then milled into a powder.

Example 4

A similar procedure to that as described in Example 2 was followed except that after the hydrolysis at 55° C. for 20 hours, the hydrolysate was subjected to a 4 week moromi fermentation process, after the addition of salt (12% m/m) and a yeast inoculum.

Finally, the hydrolysed mixture was pressed to separate a fish sauce from a solid residue. The sauce was treated at 90° C. for 20 minutes.

Example 5

A similar procedure to that as described in Example 1 was followed except that the duration of hydrolysis at 55° C. was shortened to 8 hours. After which, the hydrolysis temperature was lowered to 35° C. 1 kg of the broth culture of *Lactobacillus sake* was added when the hydrolysate temperature reached 35° C. The hydrolysis was continued for another 12 hours at 35° C. before salt addition (12% m/m) and pasteurisation at 95° C. for 20 minutes.

Example 6

A similar procedure to that as described in Example 1 was followed except that 1 kg of the broth culture of *Lactobacillus sake* was added into the cooked soya after cooling to 38° C. and at the onset of koji fermentation.

Instead of hydrolysing at 45° C., the hydrolysis of the *Lactobacillus sake* inoculated soya koji and the fish substrate was carried out at 30° C.

Example 7

A similar procedure to that as described in Example 1 was followed except that the fresh minced fish was replaced by dried anchovies. The dried anchovies to koji ratio was 0.5 and the water to koji ratio was 2.5.

The hydrolysate was found to have excellent body and a rounded flavour profile. The hydrolysate was formulated with sugar, spices, etc to form a food composition.

The invention claimed is:

1. A process of preparing a hydrolysate of an edible solid substrate, the process comprising:
   preparing a fermented koji from a protein containing material and a carbohydrate;
   mixing the fermented koji with an edible solid substrate to form a mixture, the edible solid substrate is of an origin selected from the group consisting of 1) animal and 2) a combination of plant and animal, and the animal is selected from the group consisting of fresh fish, fresh shellfish and combinations thereof; and
   hydrolysing the mixture in the absence of salt and at a predetermined temperature, the predetermined temperature being between 2° C. and 15° C. or between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.

2. A process of preparing a hydrolysate of an edible solid substrate, the pro comprising:

preparing a fermented koji from an edible solid substrate of an origin selected from the group consisting of 1) animal and 2) a combination of plant and animal, and the animal is selected from the group consisting of fresh fish, fresh shellfish and combinations thereof; and hydrolysing the fermented koji prepared from the edible solid substrate in the absence of salt and at a predetermined temperature, the predetermined temperature being between 2° C. and 15° C. or between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.

3. A process of preparing a hydrolysate of an edible solid substrate according to claim 1 wherein an optimum condition for enzyme activities of enzymes obtained from the fermented koji is provided during the hydrolysis stage.

4. A process of preparing a hydrolysate of an edible solid substrate according to claim 1 wherein the fermented koji is prepared by inoculating a protein containing material comprising a combination selected from the group consisting of wheat gluten, rice gluten, corn gluten and soya beans and a carbohydrate with a culture of *Aspergillus* on a culture bed to form the fermented koji.

5. A process of preparing a hydrolysate of an edible solid substrate according to claim 2 wherein the fermented koji is prepared by inoculating an edible solid substrate with a culture of *Aspergillus* on a culture bed to form the fermented koji.

6. A process of preparing a hydrolysate of an edible solid substrate according to claim 4 wherein the culture of *Aspergillus* is selected from the group consisting of *Aspergillus oryzae, Aspergillus sojae* and a combination thereof.

7. A process of preparing a hydrolysate of an edible solid substrate according to claim 1, the process comprising performing inoculation with a culture of a lactic acid bacteria during the koji fermentation stage.

8. A process of preparing a hydrolysate of an edible solid substrate according to claim 1, the process comprising performing inoculation with a culture of a lactic acid bacteria during the hydrolysis stage.

9. A process of preparing a food composition comprising the steps of:
   a) preparing a fermented koji by inoculating a protein containing material comprising a combination selected from the group consisting of wheat gluten, rice gluten, corn gluten and soya beans and a carbohydrate with a culture of *Aspergillus* on a culture bed;
   b) preparing an edible solid substrate that is from an origin selected from the group consisting of 1) animal and 2) a combination of plant and animal;
   c) adding water to the fermented koji of step (a) and mixing with the edible solid substrate to form a mixture;
   d) hydrolysing the mixture to form a hydrolysate in the absence of salt and at a predetermined temperature, the predetermined temperature being between 2° C. and 15° C. or between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.;
   e) adding brine solution and yeast into the hydrolysate produced at step (d) to form a moromi; and
   f) fermenting the moromi to form the food composition.

10. A process of preparing a food composition comprising the steps of:
   a) preparing a fermented koji from an edible solid substrate of an origin selected from the group consisting of 1) animal and 2) a combination of animal and plant;
   b) hydrolysing the fermented koji of step (a) to form a hydrolysate in the absence of salt and at a predetermined temperature, the predetermined temperature being between 2° C. and 15° C. or between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.;
   c) adding brine solution and yeast into the hydrolysate produced at step (b) to form a moromi; and
   d) fermenting the moromi to form the food composition.

11. A process of preparing a food composition according to claim 9 wherein the food composition is pressed to separate a liquid sauce from a solid residue.

12. A process of preparing a food composition according to claim 11 wherein the liquid sauce is pasteurised at a temperature of between 90° C. to 140° C. for a period of between 15 seconds to 30 minutes.

13. A process of preparing a food composition according to claim 11 wherein the liquid sauce is made into a powder by concentration, then dried to a low moisture content and milled into a powder to provide a solid seasoning.

14. A process of preparing a food composition comprising the steps of:
   a) preparing a fermented koji by inoculating a protein containing material comprising a combination selected from the group consisting of wheat gluten, rice gluten, corn gluten and soya beans and a carbohydrate with a culture of *Aspergillus* on a culture bed;
   b) preparing an edible solid substrate from an origin selected from the group consisting of 1) animal and 2) a combination of animal and plant, and the animal is selected from the group consisting of fresh fish, fresh shellfish and combinations thereof;
   c) adding water to the fermented koji of step (a) and mixing with the edible solid substrate to form a mixture;
   d) hydrolysing the mixture of step (c) in the absence of salt and at a predetermined temperature to form a hydrolysate, the predetermined temperature being between 2° C. and 15° C. or between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.; and
   e) processing the hydrolysate produced at step (d) into the food composition.

15. A process of preparing a food composition comprising the steps of:
   a) preparing a fermented koji from a carbohydrate and an edible solid substrate from an origin selected from the group consisting of 1) animal and 2) a combination of animal and plant, and the animal is selected from the group consisting of fresh fish, fresh shellfish and combinations thereof;
   b) adding water to the fermented koji of step (a) to form a slurry;
   c) hydrolysing the fermented koji of step (b) in the absence of salt and at a predetermined temperature to form a hydrolysate, the predetermined temperature being between 2° C. to 15° C. and between 45° C. and 60° C. or, if inoculation with a culture of a lactic acid bacteria is performed during one or more of the koji fermentation stage, the beginning of the hydrolysis stage or the hydrolysis stage, being between 15° C. and 45° C.; and d) processing the hydrolysate produced at step (c) into the food composition.

16. A process of preparing a food composition according to claim 9, the process comprising performing inoculation with a culture of a lactic acid during the koji fermentation stage.

17. A process of preparing a food composition according to claim 14, the process comprising performing inoculation with a culture of a lactic acid bacteria during the hydrolysis stage.

18. A process of preparing a food composition according to claim 17 wherein the inoculation with a culture of a lactic acid bacteria is performed at the beginning of the hydrolysis stage.

19. A process of preparing a food composition according to claim 16 wherein the culture of a lactic acid bacteria is inoculated at an inoculation density of from $10^4$ cfu/g to $10^9$ cfu/g of fermented koji prepared from a protein containing material, an edible solid substrate, or hydrolysis mixture of edible solid substrate and fermented koji prepared from a protein containing material.

20. A process of preparing a food composition according to claim 14, the process comprising inoculating a culture of a lactic acid bacteria, wherein the pre-determined temperature of the hydrolysis stage is a temperature between 15° C. to 45° C.

21. A process of preparing a food composition according to claim 14 wherein the process further comprises a step of subjecting the hydrolysis mixture to a process of wet milling during the hydrolysis stage.

22. A process of preparing a food composition according to claim 14 wherein the hydrolysate is pasteurised at a temperature between 90° C. to 140° C. for a period of between 15 seconds to 30 minutes.

23. A process of preparing a food composition according to claim 22 wherein the pasteurised hydrolysate is further processed, without pressing, into various food compositions in a form selected from the group consisting of a cooking paste, cubes, powder and granules.

24. A process of preparing a food composition according to claim 1 wherein the hydrolysis is performed at the pre-determined temperature for a period between 5 hours to 14 days to form a hydrolysate.

25. A process of preparing a food composition according to claim 1 wherein the process is performed in a non-sterilised environment.

26. A food product prepared from the process of claim 1.

27. A process of preparing a hydrolysate of an edible solid substrate according to claim 2 wherein an optimum condition for enzyme activities of enzymes obtained from the fermented koji is provided during the hydrolysis stage.

28. A process of preparing a hydrolysate of an edible solid substrate according to claim 2 wherein inoculation with a culture of a lactic acid bacteria is performed during the koji fermentation stage.

29. A process of preparing a hydrolysate of an edible solid substrate according to claim 2 wherein inoculation with a culture of a lactic acid bacteria is performed during the hydrolysis stage.

30. A process of preparing a food composition according to claim 10 wherein the food composition is pressed to separate a liquid sauce from a solid residue.

31. A process of preparing a food composition according to claim 30 wherein the liquid sauce is pasteurised at a temperature of between 90° C. to 140° C. for a period of between 15 seconds to 30 minutes.

32. A process of preparing a food composition according to claim 30 wherein the liquid sauce is made into a powder by concentration, then dried to a low moisture content and milled into a powder to provide a solid seasoning.

33. A process of preparing a hydrolysate of an edible solid substrate according to claim 5 wherein the culture of Aspergillus is selected from the group consisting of *Aspergillus oryzae, Aspergillus sojae* and a combination thereof.

34. A process of preparing a food composition according to claim 10, the process comprising performing inoculation with a culture of a lactic acid bacteria during the koji fermentation stage.

35. A process of preparing a food composition according to claim 15, the process comprising performing inoculation with a culture of a lactic acid bacteria during the hydrolysis stage.

* * * * *